United States Patent [19]

Pietrucha et al.

[11] 4,015,440
[45] Apr. 5, 1977

[54] APPARATUS FOR DEPOSITING CARBON DIOXIDE SNOW

[75] Inventors: Victor F. Pietrucha, Kearny; Michael E. Minard, Basking Ridge; Gordon J. Ozmec, Berkeley Heights, all of N.J.

[73] Assignee: Airco, Inc., Montvale, N.J.

[22] Filed: July 14, 1975

[21] Appl. No.: 595,821

Related U.S. Application Data

[62] Division of Ser. No. 523,385, Nov. 13, 1974, Pat. No. 3,932,155.

[52] U.S. Cl. ............................ 62/166; 62/330; 62/379; 141/82; 141/284; 236/15 BC
[51] Int. Cl.² ........................................ F25D 3/12
[58] Field of Search ............. 62/1, 10, 35, 76, 54, 62/379, 380, 384, 165, 166, 330; 141/70, 82, 284

[56] References Cited

UNITED STATES PATENTS

| | | | |
|---|---|---|---|
| 1,818,816 | 8/1931 | Rufener et al. | 62/10 |
| 2,165,908 | 7/1939 | Sparling et al. | 141/70 |
| 2,982,319 | 5/1962 | Magnuson | 141/70 X |
| 3,492,829 | 2/1970 | Stanford, Jr. | 62/10 X |

FOREIGN PATENTS OR APPLICATIONS

| | | | |
|---|---|---|---|
| 141,393 | 7/1930 | Switzerland | 62/10 |
| 304,958 | 1/1929 | United Kingdom | 62/10 |

Primary Examiner—Ronald C. Capossela
Attorney, Agent, or Firm—David L. Rae; Edmund W. Bopp

[57] ABSTRACT

Apparatus for providing an expendable refrigerant which is emitted from a snow horn at a low velocity thereby enabling snow agglomeration at a close proximity to the horn exit and accurately delivering a charge of snow with minimum vapor loss. The desired snow is produced by introduction of the relatively warm liquid refrigerant into an insulated compartment and in heat exchange relation with a tube therein having a plurality of length/diameter ratios. The liquid refrigerant is effective to warm the tube walls and results in a slight cooling of such liquid which is then passed to a subcooler and returned to the tube inlet for expansion in several stages therein to form the snow. The product snow is emitted from this horn at a relatively low velocity and may be accurately directed into cavities of such products as eviscerated fowl. In automated systems, a plurality of horns may be selectively operated to inject snow into a plurality of food products or alternately, such horns may be operated intermittently to deposit a blanket of snow over food products to be chilled or a continuous ribbon of snow atop products on a moving conveyor.

3 Claims, 9 Drawing Figures

APPARATUS FOR DEPOSITING CARBON DIOXIDE SNOW

This is a division of application Ser. No. 523,385 filed November 13, 1974, now U.S. Pat. No. 3,932,155.

BACKGROUND OF THE INVENTION

This invention relates to refrigeration systems and more particularly, to methods and apparatus for producing a soft, pliable $CO_2$ snow and accurately delivering the same to a point of end use as an expendable refrigerant.

In order to economically transport refrigerated food products such as meat, it has been found necessary to cool such products to a temperature just above freezing upon completion of slaughtering and trimming operations. In-transport cooling requires bulky and expensive refrigeration equipment and consumes undue periods of time and power to adequately refrigerate food products. Such cooling delays have the deleterious effect of enabling the growth of bacteria which, of course, results in increased spoilage, and consequently complete reliance on intransport cooling of food products is clearly uneconomical. Accordingly, refrigerated transport systems are typically designed so as to maintain previously chilled food products at a desired temperature by merely compensating for heat leakage into the transport vehicle or container.

In the past, various techniques for chilling food products such as slaughtered and trimmed meat have been utilized. One such technique is commonly referred to as a "community bath" which is extensively utilized for chilling dressed fowl, such as chickens. Chilling is accomplished by immersing a dressed fowl in an ice water bath for a predetermined period of time. In recent years, however, it has become apparent that this chilling technique suffers from certain disadvantages. More specifically, the spread of bacteria from one contaminated fowl to other fowl being chilled in the bath has been found to occur through the medium of the chilled or ice water bath. Accordingly, the contamination of a plurality of fowl in a bath is deleterious and hence, a clear need for economical chilling of processed food products, while avoiding contamination of a multiplicity of such products, exists.

OBJECTS OF THE INVENTION

Accordingly, it is an object of the present invention to provide methods and apparatus for producing an expendable refrigerant in the form of soft, pliable, expanding snow.

It is another object of the present invention to provide methods and apparatus for accurately delivering an expendable refrigerant such as carbon dioxide snow to a confined region such as the cavity of an eviscerated fowl thereby enabling economical and uniform chilling of the same.

It is a further object of the present invention to provide methods and apparatus for producing a soft, pliable and expanding carbon dioxide snow with a minimum of vapor loss.

It is yet another object of the present invention to provide methods and apparatus for dispensing carbon dioxide snow through a snow horn assembly wherein adherence of snow to interior walls of the horn, formation of large lumps of $CO_2$ snow and clogging of the horn assembly are substantially inhibited.

It is still another object of the present invention to provide methods and apparatus for selectively dispensing discrete charges of carbon dioxide snow to a plurality of locations in an automated manner.

It is yet another object of the present invention to provide methods and apparatus for accurately depositing carbon dioxide snow from a plurality of snow horn assemblies in a predetermined pattern.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, a method of providing refrigeration by accurately delivering an expendable refrigerant as a soft, pliable expanding snow to a point of end use comprises the steps of introducing the refrigerant in liquid phase into an insulated compartment, withdrawing the same from said compartment, subcooling said liquid, passing sub-cooled liquid to a tube having a plurality of length/diameter ratios and disposed in said compartment such that the subcooled liquid refrigerant is expanded in a plurality of said stages to form said soft pliable snow while slightly cooling said introduced warm liquid and delivering said snow to a point of end use.

In order to produce a soft, pliable snow such as $CO_2$ snow in accordance with the foregoing method, subcooled liquid carbon dioxide, preferably at a temperature of approximately $-30°$ to $-35°$ F is expanded in stages from a pressure lower than typical $CO_2$ receiver pressures, i.e. at a pressure of approximately 150 p.s.i.g. Accordingly, by expanding subcooled liquid carbon dioxide in a series of stages from the foregoing pressure to substantially atmospheric pressure, the desired $CO_2$ snow is emitted from the snow horn assembly according to this invention at a relatively low velocity which in turn enables the agglomeration of snow at a point in close proximity to the outlet or exit of this assembly. Production of carbon dioxide snow in the foregoing manner is particularly beneficial with respect to the chilling of certain food products such as fowl, wherein the delivery of snow into the cavity of an eviscerated fowl is readily facilitated. Furthermore, by intermittently passing subcooled carbon dioxide liquid to the aforementioned multistage snow horn assembly, charges of snow in predetermined weights can be accurately metered and delivered to an item to be chilled with little wastage of such snow and with a minimum vapor loss.

The aforedescribed method of producing carbon dioxide snow according to this invention may be implemented in an automated system wherein a plurality of snow horn assemblies are appropriately rotatably mounted or adapted to be reciprocated and are selectively supplied with the foregoing warm and subcooled liquid carbon dioxide. For example, a plurality of snow horn assemblies together with an appropriate manifold and conduit arrangement may be disposed in a "carousel" fashion such that by selectively supplying a liquid carbon dioxide feed, a plurality of distinct food products such as fowl may be injected with carbon dioxide snow as such products are translated on a typical conveyor means thereby enabling the rapid and efficient chilling of food products in automated manner while avoiding the spread of contamination from one fowl to another.

BRIEF DESCRIPTION OF THE DRAWINGS

The invention will be more clearly understood by reference to the following detailed description of an exemplary embodiment thereof in conjunction with the following drawing in which.

DESCRIPTION OF PREFERRED EMBODIMENTS

Figure 1:
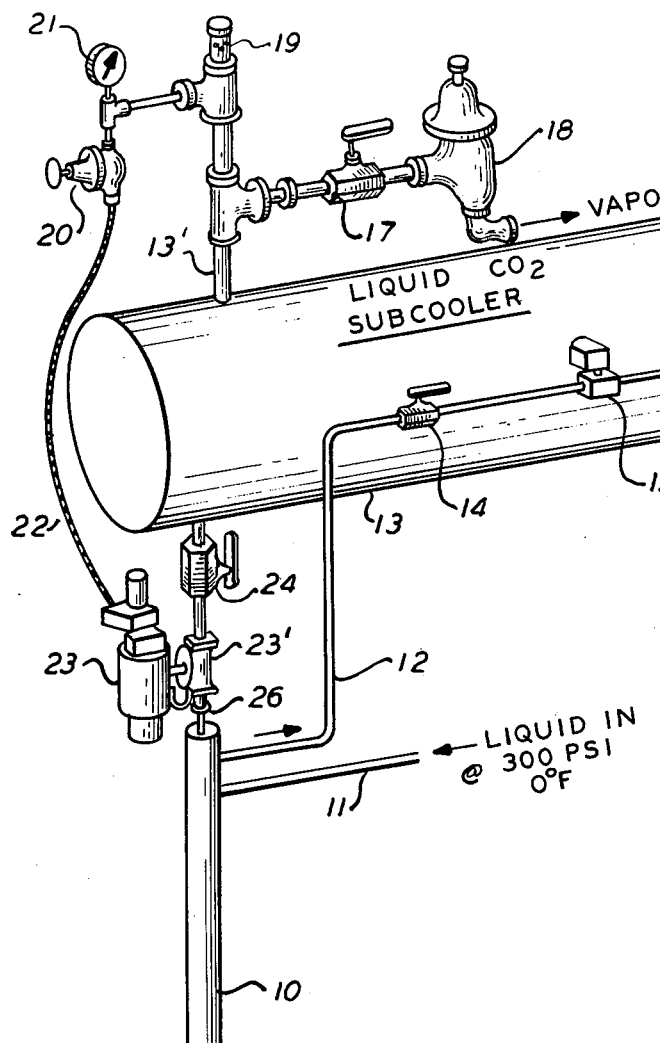
FIG. 1 is an isometric view of an exemplary embodiment of a snow horn and subcooler assembly for producing a carbon dioxide snow in accordance with the present invention.
Figure 2:
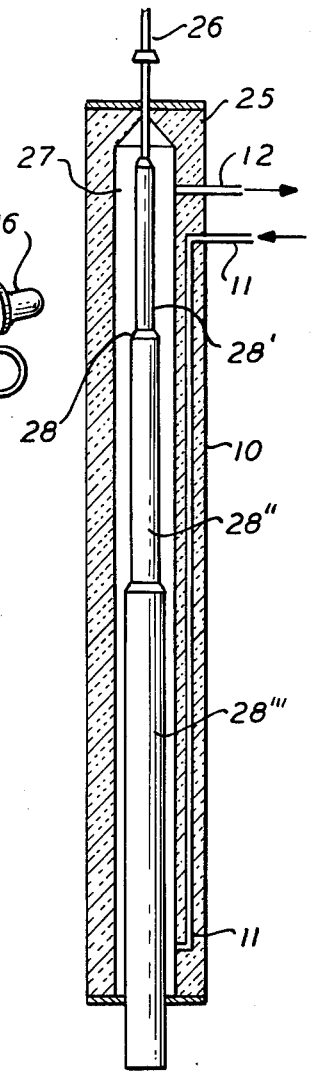
FIG. 2 is an elevational view of an exemplary embodiment of a snow horn assembly according to the present invention.

Referring now to FIG. 1, there is illustrated an exemplary embodiment of a snow horn assembly generally comprised of snow horn 10, subcooler 13, back pressure regulator 18 and suitable valves, conduits, and pressure indicating gauges. Snow horn 10 is a novel device adapted to receive liquid carbon dioxide, preferablly subcooled liquid $CO_2$, and is effective to expand such liquid therein and thereby generate a soft, pliable and expanding carbon dioxide snow. By expanding is meant the tendency of snow to fill a cavity in which it is injected. In accordance with the teachings of this invention, injection of such $CO_2$ snow has been found to "expand" once placed inside the cavity of an eviscerated fowl thereby providing a homogeneous chilling of this product. More particularly and with additional reference to FIG. 2, snow horn 10 is comprised of an insulated housing 25 defining a compartment 27 therein which, for example, may be of a cylindrical configuration. A conduit 11 which, for example, may be formed of a material such as stainless steel of sufficient strength to stand pressures therein of 300 p.s.i.g. or greater is preferably disposed to extend into a sidewall of housing 25 and downwardly therethrough to communicate with compartment 27 in the lower reaches thereof. An outlet conduit 12 which may also be comprised of a material such as stainless steel is disposed to communicate with the upper reaches of compartments 27 and extend exteriorally of housing 25 as depicted in FIG. 2. Tube 28 is also preferably comprised of a material such as stainless steel and is configured to exhibit a plurality of distinct sections each of which section 28', 28'', 28''', etc. have different length/diameter ratios. An inlet conduit 26 is disposed to extend exteriorally of housing 25 through a top portion thereof into communication with the uppermost section 28' of tube 28. The length/diameter ratio of sections of tube 28 preferably decreases generally downwardly throughout the length of tube 28 thereby enabling an expansion of a liquid refrigerant such as subcooled liquid carbon dioxide flowing downwardly therethrough. In this manner, liquid carbon dioxide is expanded to form a soft, pliable and expanding carbon dioxide snow which is emitted at a relatively low velocity from the exit of section 28'''.

Referring again to FIG. 1, conduit 12 is connected through a valve 14 which may be manually operable and conventional and a solenoid valve 15, preferably of a type well known to those skilled in the art, to an inlet of subcooler 13. A liquid level sensing means 16 which may take the form of a device effective to sense the level of a liquid within a vessel such as subcooler 13 and, well known to those skilled in the art, is coupled to solenoid 15. Thus, upon the level of liquid carbon dioxide in subcooler 13 exceeding a predetermined level, controller 16 is effective to generate an electrical signal which actuates solenoid valve 15 by closing the same thereby inhibiting the passage of further liquid carbon dioxide to subcooler 13, which is preferably comprised of a pressure vessel adapted to retain liquid carbon dioxide therein under a predetermined pressure. Preferably, subcooler 13 includes an insulated housing portion 30 together with an exterior metal surface and is adapted to withstand pressures of at least 300 p.s.i.g. Subcooler 13 is connected to a liquid outlet conduit 26 with a vapor outlet conduit 13' coupled through a suitable valve 17 to a back pressure regulator 18, which device is conventional and well known to those skilled in the art. By disposing conduit 26 to extend upwardly into subcooler 13, liquid withdrawn therefrom is taken from just below the liquid surface. Any solid or "slush" $CO_2$ that may form in the lower reaches of subcooler 13 will not impede the withdrawal of subcooled liquid and clogging of conduit 26 is thus substantially inhibited. In operation, the steam of liquid emitted from conduit 12 will undergo a reduction of pressure upon entering sub-cooler 13 and the pressure therein may be maintained by means of back pressure regulator 18 at a predetermined pressure of, for example, 150 p.s.i.g. in the vapor space above liquid carbon dioxide within subcooler 13. As a result of evaporation or "boil-off" of liquid $CO_2$ therein, and consequently a removal of heat therefrom, liquid carbon dioxide is subcooled preferably to a temperature of $-30°$ to $-35°$ F. Vapor generated by such evaporation is either vented to atmosphere through back pressure regulator 18 or is collected by a vapor recovery system (not shown) for liquefaction and return to a receiver supply of liquid carbon dioxide for further use as a $CO_2$ feed. The liquid carbon dioxide subcooled within device 13 may then be continuously or selectively removed through conduit 26 as will be described in greater detail hereafter.

A pressure relief valve 19 and pressure regulator 20 are connected to outlet conduit 13'. Relief valve 19 may take the form of any conventional device adapted to vent to atmosphere vapor within subcooler 13 upon the pressure therein exceeding a predetermined level such as, for example, 350 p.s.i.g. Pressure regulator 20, which may comprise a conventional pressure regulating device well known to those skilled in the art is preferably adjusted to supply carbon dioxide vapor to conduit 22 at a predetermined pressure of, for example, 70 p.s.i.g. In addition, a pressure gauge 21 may also be coupled to conduit 13' for the purpose of providing a visual indication of the pressure therein. Conduit 22 may comprise a flexible hose or the like capable of withstanding pressures on the order of approximately 70 p.s.i.g. and is connected to a valve actuator 23 which in turn is coupled to ball valve 23'. In operation, application of an electrical signal through a suitable energizing means (not shown) to actuator 23 is effective to actuate ball valve 23' as a consequence of the application of a pneumatic ($CO_2$) pressure of approximately 70 p.s.i.g. thereto. Such pneumatic actuator and ball valve devices are conventional and are commercially available from Worcester Valve Company. In addition, a manual shutoff of subcooled liquid carbon dioxide exiting from subcooler 13 may be effected by closure of manually operable valve 24 in the event that ball valve 23' were to jam in an open position or need to be replaced or cleaned because of malfunction.

Figure 3:
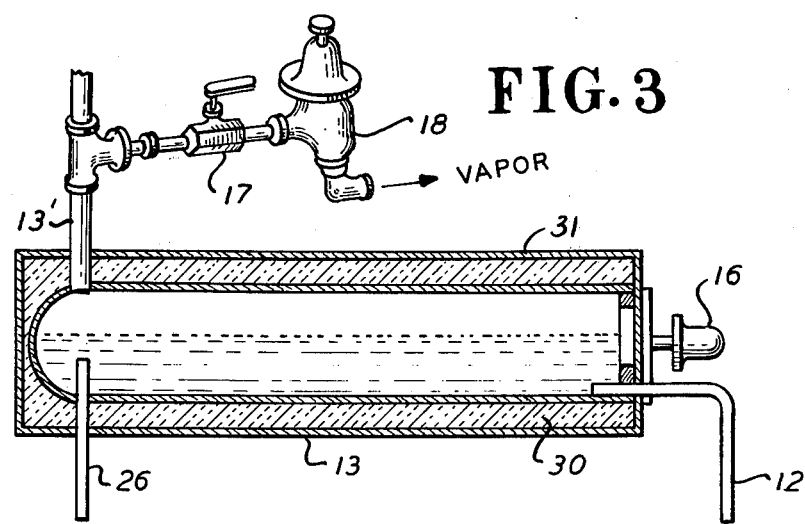
FIG. 3 is a partial isometric and elevational view of an exemplary embodiment of a subcooler and associated pressure regulator in accordance with the present invention.

Operation of the overall snow horn assembly depicted in FIGS. 1-3 will now be described. Initially, liquid carbon dioxide from a suitable supply thereof is passed through conduit 11 at a pressure of approximately 300 p.s.i.g. and temperature of approximately 0° F and is then introduced to compartment 27 of snow horn 10. This relatively warm liquid carbon dioxide has the effect of slightly heating the walls of tube 28 thereby inhibiting the accumulation of large lumps of $CO_2$ snow on the interior thereof and hence, clogging of tube 28 is substantially precluded. Liquid carbon dioxide introduced into compartment 27 is slightly cooled to a temperature of 0°-5° F, for example, and is then passed intermittently under the control of level sensing device 16 through conduit 12 and values 14 and 15 to subcooler 13 wherein such liquid is reduced in pressure subcooled by evaporation thereof to a temperature of, for example, −30° to −35° F and is maintained under a pressure of approximately 150 p.s.i.g. means of back pressure regulator 18. Upon the application of a suitable signal, such as an electrical energizing signal supplied to actuator 23, valve 23' is pneumatically operated to enable a flow of subcooled liquid carbon dioxide through previously opened manual valve 24 to inlet conduit 26 of snow horn 10. Expansion of the aforementioned subcooled liquid $CO_2$ occurs in stages within sections tube 28 of snow horn 10 and by expanding such liquid in stages, carbon dioxide snow of a soft pliable nature will be discharged from tube 28 at a relatively low velocity and will agglomerate at a point of close proximity (e.g. 1.0 inch) to the lower end or exit of section 28'''. Accordingly, the foregoing snow horn assembly is particularly well suited to the production of carbon dioxide snow and the accurate delivery thereof in relatively small amounts into confined and somewhat inaccessible volumes such as the cavity of an eviscerated fowl or other animal. In addition, the expansion of subcooled liquid $CO_2$ has also been found to result in lower vapor losses inherent in the production of $CO_2$ snow.

Figure 4:
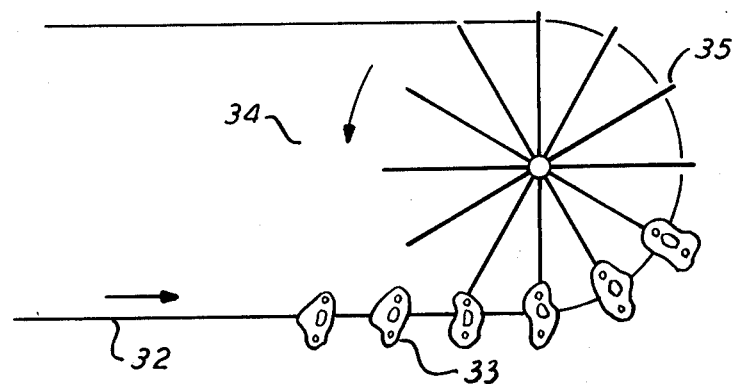
FIG. 4 is a diagrammatic view of an exemplary embodiment of an arrangement of a plurality of snow horn assemblies.

Referring now to FIG. 4, there is illustrated a further embodiment of the present invention wherein a plurality of snow horns (not shown) may be mounted on corresponding translatable support elements 35 in the form of a carousel assembly 34. Items such as eviscerated fowl 33 to be chilled may be translated by suitable means such as conveyor 32 in cooperation with assembly 34 such that upon alignment of individual snow horns with a particular food product, a charge of carbon dioxide snow may be injected therein, or thereon, thereby chilling such product. Detecting means (not shown) such as a conventional photoelectric sensing device may be utilized to detect alignment of a food product to be chilled and a particular snow horn device. In this manner, assembly 34 may be rotatably translated such that upon the selective production of $CO_2$ snow, food products such as eviscerated chickens, translated sequentially by conveyor means 32 into a juxtaposed relationship with respect to individual corresponding snow horns, will be chilled upon receipt of a charge of snow.

Figure 5:
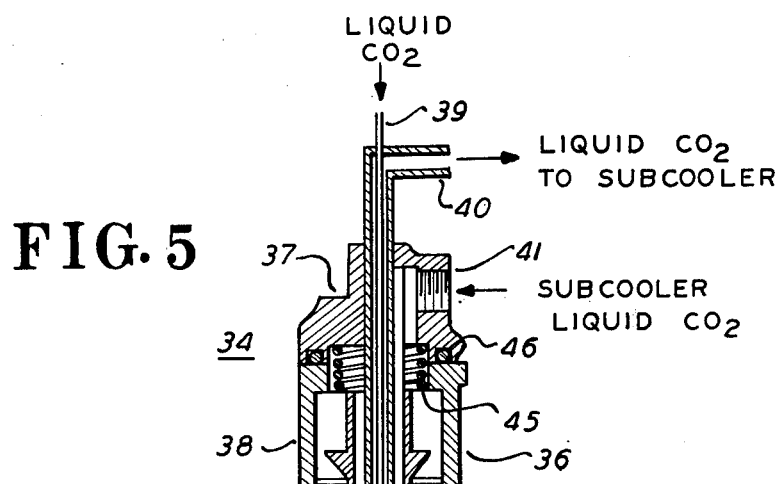
FIG. 5 is a partial elevational view of a plural snow horn assembly mounted for rotation in accordance with the present invention.
Figure 5:
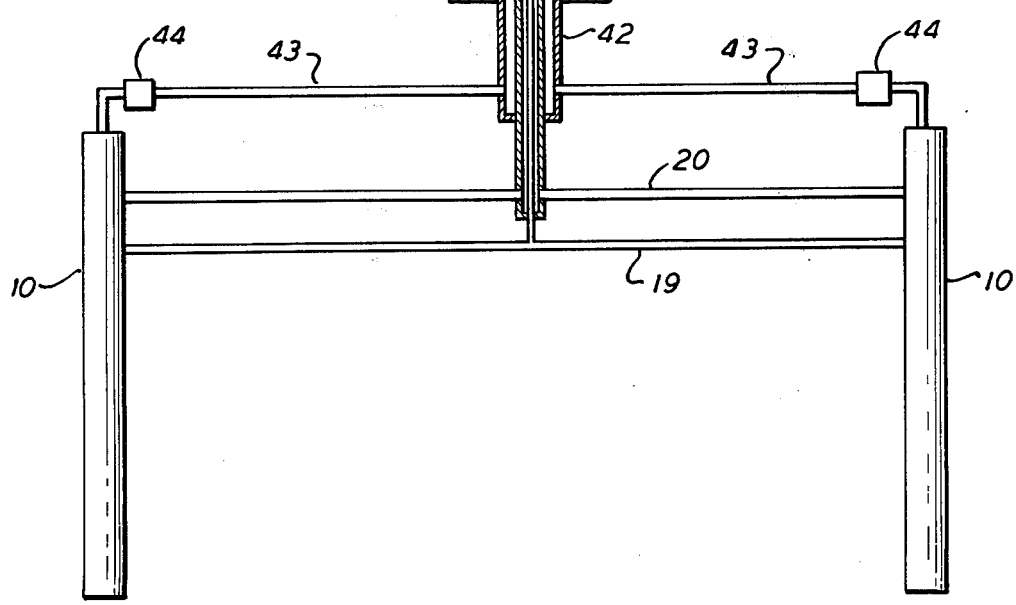

In FIG. 5, the exemplary embodiment of the snow horn assembly diagrammatically illustrated in FIG. 4 is depicted in somewhat greater detail. Assembly 34 is comprised of a plurality of snow horns 10 and a suitable rotary joint 36 together with appropriate valves and conduits. Rotary joint 36 is comprised of an upper stationary portion 37 and a lower rotating portion 38. Upper portion 37 is provided with a suitable inlet 41 and is adapted to receive subcooled liquid carbon dioxide at a pressure of approximately 150 p.s.i.g. as heretofore described. In addition, sealing means such as pressure spring 46 are provided between upper and lower portions 37 and 38. A carbon graphite guide 45 is appropriately disposed between portions 37 and 38 of rotary joint 36 and a suitable conduit 42 which extends upwardly into lower portion 38 in a sealed relationship therewith is disposed to receive subcooled liquid carbon dioxide. In addition, conduits 43 and associated valves 44 are disposed in communication between the lower reaches of conduit 42 and the upper inlet of each of a plurality of associated snow horns 10. A conduit 39 is disposed to receive liquid carbon dioxide at, for example, a pressure of 300 p.s.i.g. at the upper inlet thereof and is in communication with conduits 19 and subsequently, compartment 27 (FIG. 2) of snow horn 10. Return conduits 20 also communicate with compartments 27 as well as conduit 40 to enable the return of slightly cooled liquid carbon dioxide to subcooler 13. In addition, suitable drive means (not shown) are provided for rotating the carrousel arrangement of snow horns 10, conduits 19, 20 and 43 by driving the lower rotating portion 38 of joint 36 in known manner.

Operation of the exemplary apparatus illustrated in FIG. 5 entails the introduction of relatively warm (0° F) liquid $CO_2$ through conduit 39 and conduits 19 into the compartment 27 (FIG. 2) of snow horns 10. The slightly cooled liquid (−1°, −2° F) is returned from such compartments via conduits 20 and 40 to subcooler 13 (FIG. 1) with subcooled liquid $CO_2$ being introduced through inlet 41 of the upper stationary portion of rotary joint 36 under a pressure of approximately 150 p.s.i.g. By selectively applying subcooled liquid $CO_2$, such as by selectively operating valve actuator 23 and ball valve 23' (FIG. 1) subcooled liquid carbon dioxide will be applied to snow horn 10 and consequently, charges of $CO_2$ snow will be emitted therefrom at a relatively low velocity and in a predetermined and controlled manner. Thus, by synchronizing the production of charges of $CO_2$ snow in the foregoing manner with, for example, the translation of food products, such as eviscerated chickens, to be chilled, a rapid and efficient injection of $CO_2$ snow into such product will be achieved with a minimum vapor loss in accordance with the teachings of the present invention. It will be appreciated that conventional photoelectric and logic means may be utilized to effect the aforementioned synchronization. In the foregoing manner the production and accurate delivery of carbon dioxide snow may be substantially automated and thus made particularly beneficial for use in industrial food processing plants.

In certain applications, translation of a snow horn assembly may not be necessary although it will be required to accurately deliver an expendable refrigerant such as $CO_2$ snow in a predetermined geometrical pattern in order to attain certain refrigeration objectives. For example, with relatively wide conveyor surfaces in certain food processing plants, it may be desirable to dispose a plurality of products to be chilled in a line transverse to the direction of conveyor motion. Accordingly, a snow horn pack 50 as illustrated in an exemplary manner in FIG. 6 will be effective to accurately deliver a plurality of charges or continuing amounts of $CO_2$ snow. Snow horn pack 50 is generally comprised of a housing or shell 51 for retaining and supporting a plurality of aligned snow horns 10, which preferably comprise the snow horn illustrated in FIG. 2 and described heretofore. In addition, an inlet conduit and manifold arrangement 53 is provided for passing relatively warm liquid carbon dioxide to the compartment of each snow horn while an outlet manifold and conduit arrangement 54 is provided for collecting slightly cooled liquid carbon dioxide and passing the same to a subcooler (not shown). In addition, a further conduit 51 is appropriately connected to supply subcooled liquid carbon dioxide to a manifold 52 with each outlet of such manifold coupled to corresponding snow horns 10. Accordingly, upon the appropriate energization of an actuating device, such as actuator 23 and ball valve 23' (FIG. 1), $CO_2$ snow will be delivered simultaneously from each of snow horns 10 thereby enabling refrigeration of a plurality of distinct food products.

Figure 7:
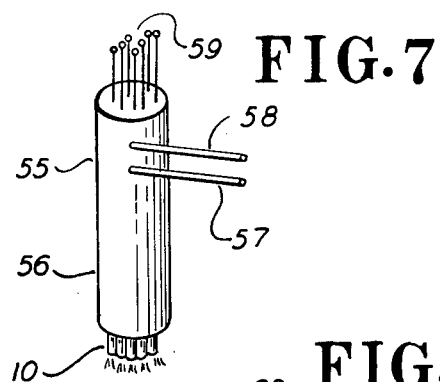
Figure 8:
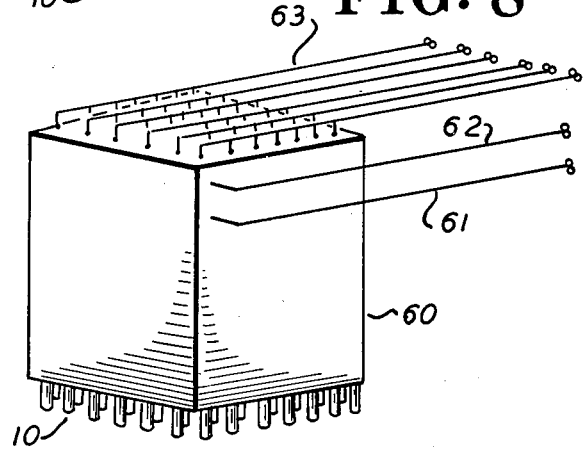

In FIGS. 7 and 8, exemplary apparatus which enables the delivery of carbon dioxide snow in a predetermined geometric pattern is depicted. Initially, with reference to FIG. 7, a snow horn assembly 55 is provided having a housing or support means 56 for retaining in an appropriately configured arrangement and array of snow horns 10. Liquid carbon dioxide inlet and outlet conduits 57 and 58 are provided together with conduits 59 for supplying subcooled liquid carbon dioxide to corresponding ones of snow horns 10. Accordingly, upon passing subcooled liquid $CO_2$ through conduits 59 to snow horns 10, separate streams of $CO_2$ are emitted therefrom in a geometrical pattern corresponding to the geometric array of horns 10. Thus, the delivery of $CO_2$ snow in clusters or other particular geometrical configurations is enabled upon utilization of the snow horn assembly depicted in FIG. 7. With reference to FIG. 8, illustrated therein is a snow assembly 60 wherein a plurality of snow horns 10 are provided for expansion therein of subcooled liquid $CO_2$ and hence the production of individual streams of $CO_2$ snow in a rectangular type cluster array. Accordingly, in those applications wherein a plurality of streams of charges of $CO_2$ snow is required over a retangular area, the snow horn assembly 60 will find particular application.

Figure 6:
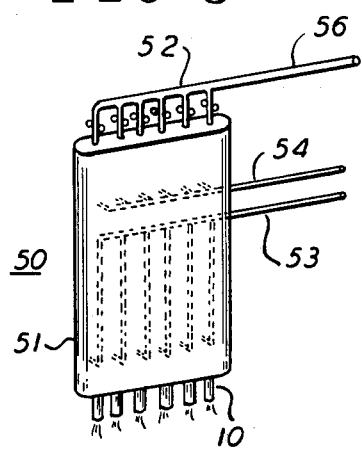
FIGS. 6–8 represent diagrammatic views of snow horn assemblies wherein a plurality of individual snow horns are configured in linear or cluster arrays to enable the delivery of carbon dioxide snow in a predetermined geometrical pattern.
Figure 9:
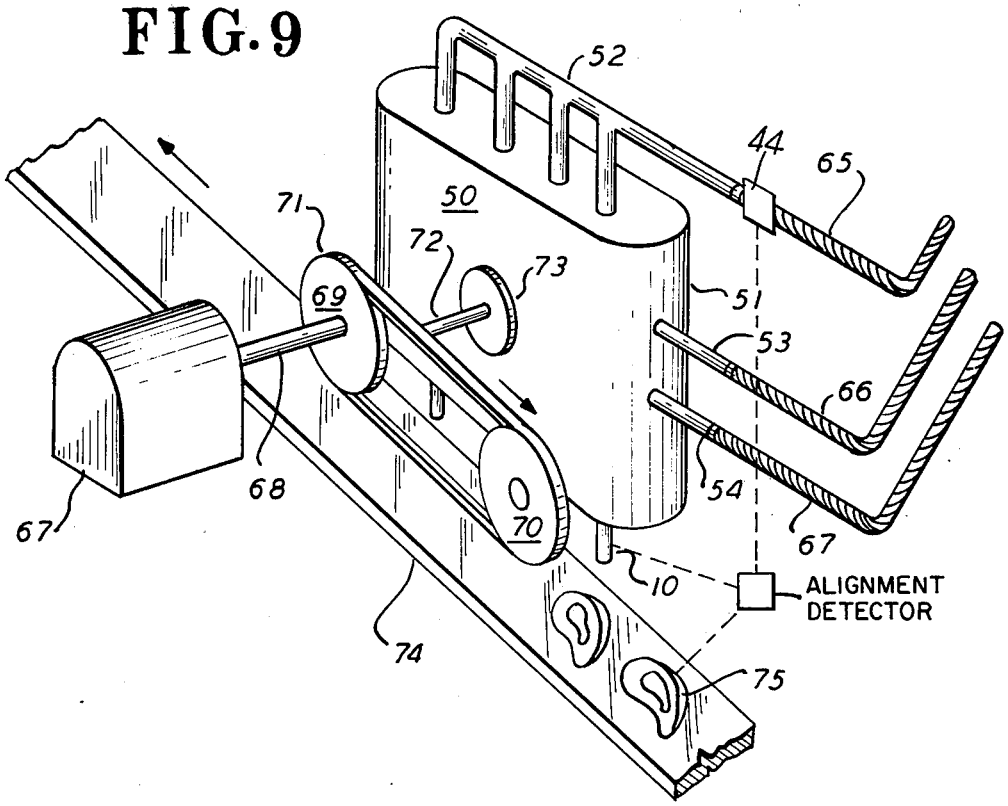
FIG. 9 is an isometric view of an exemplary embodiment of a snow horn assembly adapted for reciprocating motion in accordance with the teachings of the present invention.

In FIG. 9, a further exemplary embodiment of the present invention is illustrated and which is generally comprised of snow horn assembly 50 and related conduits, reciprocating drive means 67–72 and conveyor means 74. Snow horn assembly 50 which preferably comprises the apparatus previously described and illustrated in FIG. 6 is provided with a plurality of flexible conduits 65, 66 and 67 which are couples to manifold 52 and conduits 53 and 54, respectively. While manifold 52 is illustrated as capable of supplying subcooled liquid carbon dioxide through four inlet connections to snow horns 10, it will be appreciated that any desired number of inlet connections and snow horns may be utilized. In addition, it is prefered that housing 51 together with the appropriate internal supporting members (not shown) are provided with sufficient rigidity to withstand rather rapid reciprocating motion of assembly 50.

An electrical motor 67, which may be provided with conventional clutching and gearing equipment, if effective to rotatably drive an output shaft 68 and wheel 69 affixed thereto. A chain or belt 71 is entrained about drive wheel 69 and idler wheel 70 and, for example, may be driven in a clockwise direction as indicated in FIG. 9. A rigid arm or support member 72 is preferably secured to chain or belt 71 and is journaled to a suitable base or support 73 rigidly affixed to snow horn assembly 50. A conveyor means 74, which may be a conventional conveyor belt well known to those skilled in the art, is disposed preferably below the aforedescribed snow horn assembly 50 and the aforedescribed drive means therefor. Furthermore, suitable means (not shown) for driving conveyor 74 at a desired speed are also provided.

Operation of the exemplary refrigeration apparatus illustrated in FIG. 9 requires a synchronization between the reciprocating motion of snow horn assembly 50 and the application of sub-cooled liquid $CO_2$ thereto. Thus, upon motor 67 supplying a drive to wheel 69 and hence belt or chain 71, snow horn assembly 50 is translated in a reciprocating fashion. Thus, as the portion of chain or belt 71 whereat support arm 72 is affixed is traversing the upper run of the oval path generally defined by wheels or rollers 69 and 70, and as shown in FIG. 9, assembly 50 will be raised upwardly above conveyor 74 and upon traversing roller 70, support arm 72 will be lowered such that the lower extremities of snow horns 10 will be appropriately spaced above products 75 on conveyor 74. As support arm 72 traverses the lower run of the path defined by wheels or rollers 69 and 70, a timed electrical signal will be supplied to actuator 23 thereby opening valve 23' to pass subcooled liquid $CO_2$ to snow horns 10 and thus deliver a stream or change of carbon dioxide snow to products 75. For example, in chilling eviscerated fowl, a charge of $CO_2$ snow will be injected into the cavity of such a product. As support arm 72 affixed to chain or belt 71 begins to ascend as this belt traverses wheel or roller 69, the aforementioned electrical signal supplied to actuators 23 is terminated thereby discontinuing the production and delivery of $CO_2$ snow until snow horn assembly 50 is returned to an appropriate position along the lower run of chain or belt 71 adjacent to wheel 70 as heretofore described. It will be appreciated, however, that as no carbon dioxide snow is delivered by assembly 50 during traversal of the upper run of chain or belt 71, it may be necessary to provide a second assembly and drive means therefor (not shown) in the event that products 75 are continually presented for receipt of carbon dioxide snow in a refrigeration process. Accordingly, the operation of such second drive means and snow horn assembly (not shown) would be synchronized with the aforedescribed operation of snow horn assembly 50 and drive train 67-72. In this manner a substantially continuous and uniform yet rapid and efficient accurate delivery of carbon dioxide snow to individual food products 75, such as eviscerated fowl, will be attained in accordance with the teachings of the present invention.

Although it is preferred to supply subcooled liquid carbon dioxide to snow horns 10 at a pressure of approximately 150 p.s.i.g., tests have indicated that such horns will operate satisfactorily upon receiving liquid $CO_2$ at pressures up to approximately 280 p.s.i.g. At such higher pressures, a greater volume of snow is produced in a similar pattern as at lower pressures; however, the velocity at which snow is dispensed and the vapor produced are likewise increased. In dispensing snow at such higher velocities, minor shielding may be provided to curtail dispersal of stray snow thereby increasing the deposition of snow in the desired pattern.

While the present invention has been particularly described in terms of specific embodiments thereof, it will be understood that numerous variations upon the invention are now enabled to those skilled in the art, which variations are yet within the instant teachings. Accordingly, the present invention is to be broadly construed and limited only by the scope and the spirit of the claims now appended hereto.

What is claimed is:

1. Apparatus for depositing carbon dioxide snow onto items to be refrigerated comprising a plurality of snow horn means for receiving liquid carbon dioxide and emitting said snow therefrom; valve means for selectively enabling passage of liquid carbon dioxide to said plurality of snow horn means; means for translating said items; means for translating said snow horn means into alignment with corresponding ones of said items; means for detecting said alignment; and means responsive to detection of said alignment for operating said valve means to enable passage of said liquid carbon dioxide to said snow horn means aligned with said items whereby said snow is deposited onto corresponding ones of said items.

2. Apparatus as defined in claim 1 wherein said means for translating said snow horn means include means for rotating said plurality of snow horn means and wherein said means for translating said items comprise conveyor means for passing said items in a curved path beneath and substantially aligned with corresponding ones of said horn means.

3. Apparatus as defined in claim 1 wherein said means for translating said items comprise conveyor means and wherein said means for translating said snow horn means comprise means for supporting said plurality of said horn means in a substantially linear array and reciprocating drive means for translating said array of snow horn means in a linear path throughout a portion of which path said snow horn means are aligned with and are in close proximity to said items.

* * * * *